UNITED STATES PATENT OFFICE.

ALCIDE FRANÇOIS POIRRIER, OF PARIS, FRANCE.

GREEN DYE.

SPECIFICATION forming part of Letters Patent No. 423,341, dated March 11, 1890.

Application filed October 21, 1889. Serial No. 327,703. (Specimens.)

*To all whom it may concern:*

Be it known that I, ALCIDE FRANÇOIS POIRRIER, a citizen of the Republic of France, residing in Paris, France, have invented certain new and useful Improvements in the Production of Coloring-Matters, of which the following specification is a full, clear, and exact description.

This invention relates to the production of certain new coloring-matters; and it consists in the new leuco bases and their derivatives, hereinafter described, and the coloring-matters obtained therefrom, and also in the process of preparing such bodies or matters.

I have discovered that paratoluidine, a metaxylidine, pseudocumidine, and mesidine can be condensed with tetramethyldiamidobenzhydrol, and thus give rise to new leuco bases susceptible of producing by oxidation new green and greenish-blue coloring-matters. As an example, the operation with paratoluidine will be given. With the others it is substantially similar in all points. Hydrochloric or sulphuric acid is employed for effecting the condensation, the leuco bases being somewhat different, according as one or the other of the acids is used. By heating in a water bath for a day one molecule of tetramethyldiamidobenzhydrol, two molecules of hydrochloric acid, and a molecule and a half of hydrochlorate of paratoluidine until the transformation of the hydrol is complete, a leuco base is obtained after purification of a determinate constitution whose melting-point is 180° centigrade. By heating to 30° centigrade only for one or two days twenty-seven (27) kilograms of tetramethyldiamidobenzhydrol, twelve (12) kilograms of paratoluidine, and three hundred and twenty (320) kilograms of concentrated sulphuric acid of 66° Baumé, a leuco base is obtained which after purification melts at 160° centigrade. The two leuco bases yield by direct oxidation triamidotetramethyldiphenyltolyl carbinol, a green coloring-matter dyeing wool in neutral bath and cotton mordanted with tannin. These leuco bases or their oxidation products can be diazotized with one molecule of nitrite of soda in an aqueous and very acid medium, and the diazoic derivatives obtained give, under the action of heat, the corresponding hydroxyl derivatives. These two leuco bases can be subjected to the action of the chloride, bromide, iodide of ethyl or of methyl, and give the corresponding dimethylic and diethylic derivatives. Hexa-alkyl leuco bases are then obtained which by oxidation give green coloring-matters with special properties. These two leuco bases, and also those obtained with xylidine, pseudocumidine, mesidine, can be transformed into dibenzylic derivatives by the action of chloride of benzyl. By oxidation green or blue-green coloring-matters are obtained which can be employed to dye wool or cotton mordanted with tannin. The same products are obtained by benzylating the oxidation products of the leuco bases. Finally the benzylated coloring-matters or their leuco bases can be sulpho-conjugated and give rise to very beautiful acid blue-green coloring-matters essentially appropriate to the dyeing of wool.

The operation is, for example, carried on as follows: Thirty-six (36) kilograms of one of the leuco bases from paratoluidine are treated with twenty-six (26) kilograms of chloride of benzyl, twenty-two (22) kilograms of carbonate of soda, and two hundred (200) liters of water, at an elevated temperature, for some hours, in an apparatus with means for returning the water of evaporation. After the reaction the excess of the chloride of benzyl is eliminated and the benzylic base transformed into sulphate, dried, and subjected to sulpho-conjugation. Here fifty (50) kilograms of benzylated base are introduced into two hundred and fifty (250) kilograms of fuming sulphuric acid, and the whole is heated until a test portion dissolves completely in boiling water. Then the excess of sulphuric acid is eliminated, the very soluble sulpho-conjugated leuco base is filtered, and the liquid gives by oxidation the acid green coloring-matter soluble in water.

The coloring-matters obtained, whether from the hydrochloric leuco base or from the sulphuric leuco base, are a little different in shade. They vary from green-blue to blue-green. By their extreme solubility in water and their acid character they present great affinity for wool fiber, which they dye in acid bath with the greatest facility.

The invention extends to the preparation of basic or acid coloring-matters, and in the preparation of the oxidation products of the hydroxyl, methyl, ethyl, benzyl, or sulpho-conjugated benzyl derivatives of the leuco bases oxidation may precede or may follow the formation of said derivatives.

The sulpho-benzylated coloring-matters from tetramethyldiamidobenzhydrol and paratoluidine are readily soluble in hot or cold water, slightly soluble in cold alcohol, more so in hot, sufficiently soluble in crystallizable acetic acid, but totally insoluble, even at an elevated temperature, in benzol, toluol, petroleum, and ether.

An essential feature of the present invention is the condensation of diamidobenzhydrol with aromatic amines substituted in the para position. Heretofore these condensations were only effected with aromatic amines in which the para position with reference to the $NH_2$ group was free, the coloring-matters obtained being all of a violet shade—as hexamethyl rosaniline, for example.

I have discovered that the amines substituted in the para position, whose number is, moreover, restricted, can also be condensed with tetramethylbenzhydrol, but under special conditions. There is, then, an amido group which is no longer in the para position with reference to the union with the central carbon, and the tint, in place of being violet, varies from green to blue-green.

The following is a schematic formula for the new coloring-matters, the sulpho-benzylated derivate obtained from the condensation products with paratoluidine being given as an illustration:

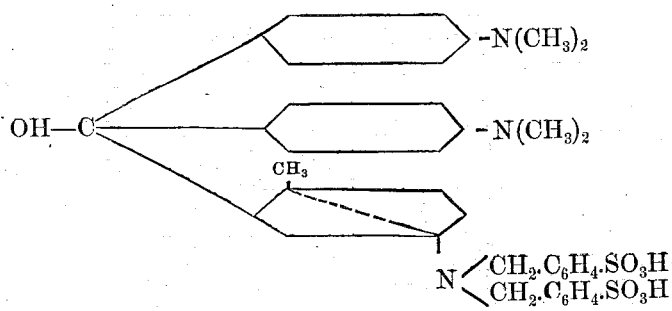

I claim as my invention or discovery—

1. The new coloring-matters herein described, the same being of a green or greenish tint and consisting of or convertible into sulpho-benzylated derivatives soluble in water, and comprising the oxidated leuco bases from condensing tetramethyldiamidobenzhydrol with aromatic amines substituted in the para position, and the specified oxidated derivatives of such leuco bases, substantially as set forth.

2. The leuco bases from condensing tetramethyldiamidobenzhydrol with aromatic amines substituted in the para position, and the specified derivatives of such condensation products, the said leuco bases yielding by oxidation coloring-matters of a green or greenish tint, which consist of or are convertible into sulpho-benzoled derivatives soluble in water, substantially as set forth.

3. The process of producing green or greenish coloring-matters by condensing with tetramethyldiamidobenzhydrol, in a hydrochloric or sulphuric medium, paratoluidine, a metaxylidine, pseudocumidine, amidotrimethylbenzol, or mesidine, and subjecting the leuco bases thus formed to oxidation, or oxidation in conjunction with the formation of hydroxyl, methyl, ethyl, benzyl, and sulpho-conjugated benzyl derivatives of said leuco bases, substantially as described.

4. The process of producing the leuco bases by condensing with tetramethyldiamidobenzhydrol, in a hydrochloric or sulphuric medium, paratoluidine, a metaxylidine, pseudocumidine, amidotrimethylbenzol, or mesidine, substantially as described.

In witness whereof I have hereunto signed my name in the presence of two subscribing witnesses.

ALCIDE FRANÇOIS POIRRIER.

Witnesses:
JULES ARMENGAUD, Jeune,
R. J. PRESTON.

It is hereby certified that in Letters Patent No. 423,341, granted March 11, 1890, upon the application of Alcide François Poirrier, of Paris, France, for an improvement in "Green Dyes," errors appear in the printed specification requiring the following corrections, to wit: In line 15-16, page 1, and in lines 24-25 and 35 of the claims, page 2, the letter and word "a metaxylidine" should read *alpha-metaxylidine*, and in line 19 of the claims, page 2, the word "sulpho-benzoled" should read *sulpho-benzylated;* and that the said Letters Patent should be read with these corrections therein that the same may conform to the record of the case in the Patent Office.

Signed, countersigned, and sealed this 8th day of April, A. D. 1890.

[SEAL.]

CYRUS BUSSEY,
*Assistant Secretary of the Interior.*

Countersigned:
C. E. MITCHELL,
*Commissioner of Patents.*